United States Patent [19]

Ryle, Jr.

[11] 4,180,224
[45] Dec. 25, 1979

[54] AERIAL DISPERSAL SYSTEM
[75] Inventor: Dallas M. Ryle, Jr., Marietta, Ga.
[73] Assignee: Lockheed Corporation, Burbank, Calif.
[21] Appl. No.: 894,163
[22] Filed: Apr. 6, 1978
[51] Int. Cl.² ............................................. B64D 1/18
[52] U.S. Cl. ..................................... 244/136; 239/171; 169/53; 244/199
[58] Field of Search ....................... 244/136, 199, 215; 239/171; 169/53

[56] References Cited

U.S. PATENT DOCUMENTS

| | | | |
|---|---|---|---|
| 1,759,032 | 5/1930 | Bauer | 244/215 |
| 2,591,157 | 4/1952 | Hutchinson | 244/136 |
| 3,204,895 | 9/1965 | Razak | 244/136 |
| 3,484,062 | 12/1969 | Johnson | 239/171 |

*Primary Examiner*—Galen L. Barefoot
*Attorney, Agent, or Firm*—John J. Sullivan

[57] ABSTRACT

A series of dispersal nozzles is placed along the wing of an airplane near the hinge line of its edge flap which extends virtually from wing-root to wing-tip and is made up of numerous individual spanwise flap segments. Adjacent flap segments deflect in opposite directions so that a discontinuity exists in the trailing edge and, locally, high turbulence results. By placing the nozzles in this region, and ejecting the dispersants at these points, rapid and controlled distribution of these dispersants is made. This trailing edge flap arrangement is also used as a flight path control device both during and at the end of dispersal passes by the airplane.

5 Claims, 2 Drawing Figures

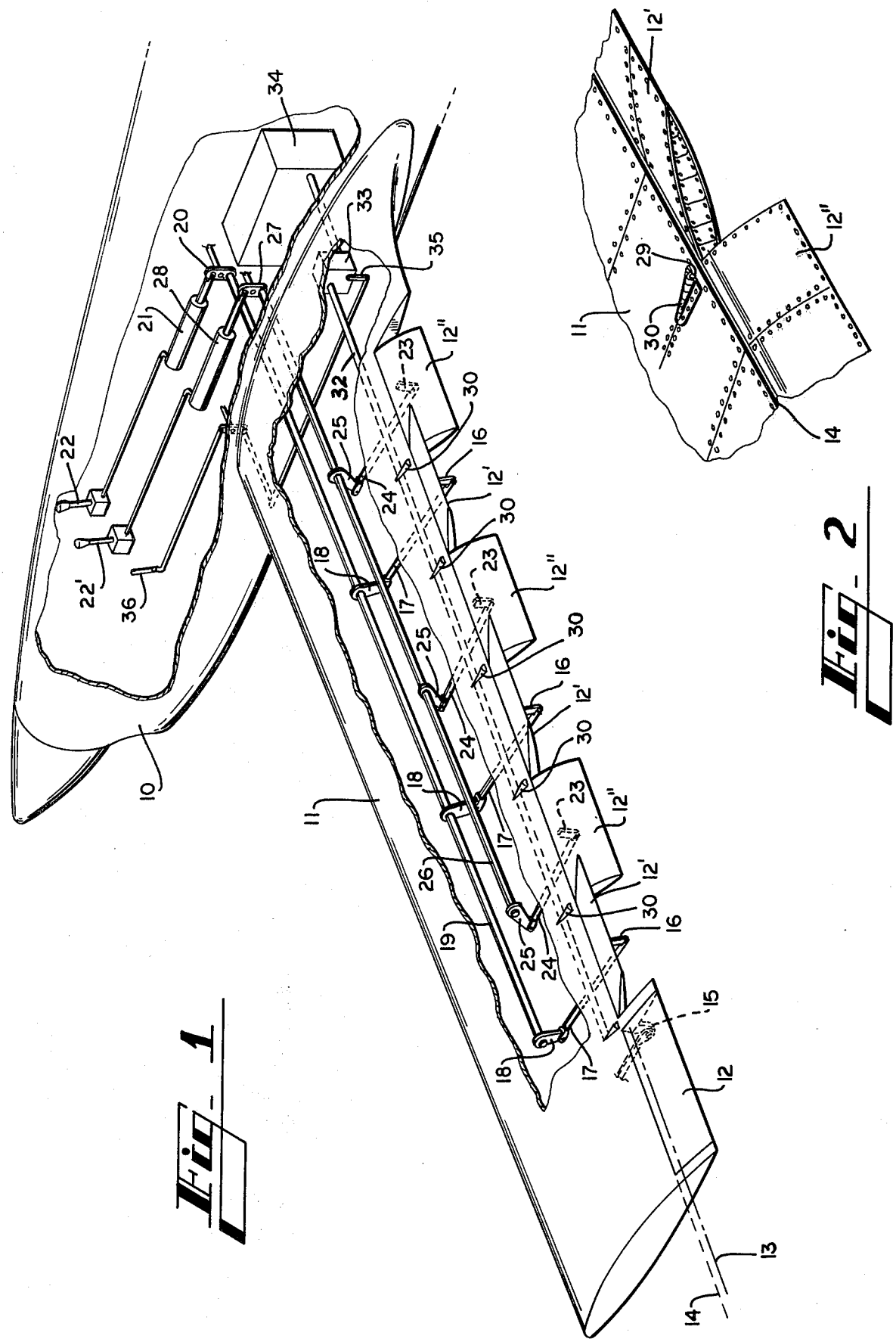

AERIAL DISPERSAL SYSTEM

This invention relates to aerial dispersal devices by which chemicals are distributed from aircraft and more particularly to such a device whereby a wide distribution and level of turbulent mixing is controlled by means of and through the generation of a number of discrete vortices in the wake of an aircraft wing and the use of these vortices to disperse the chemicals.

Aerial dispersal of chemicals, in both liquid and solid form sometimes referred to as "crop dusting", employed to treat diseased foliage as well as to control insect infestation has been practiced for many years. It is economically justified where large tracts are involved and in areas that are not otherwise accessible. Usually, crude deployment systems are used, among the better systems being employed for this is a so-called "spray bar". Generally speaking a spray bar is a duct or tube secured to the lower surface of each airplane wing adjacent the aft or trailing edge thereof and extending from root to tip. The wall of the tube is perforated and the chemical or dispersant is forced through the tube by appropriate pressure means and discharged over the selected area as the airplane passes at a very low altitude.

Such present day spraying leaves much to be desired. In the first place weather conditions often make it impossible to apply or spray the dispersants when required. In addition, this spraying is wasteful where insufficient applications result in the place needed or even worse, where overdosed, damage to crops and animals can result.

It is the purpose of the present invention to provide a dispersal device to permit the distribution of chemicals from airplanes in a more controlled and efficient manner. To this end the device herein proposed not only includes means to eject the dispersant in such a manner that it is broadcasted in a wide swath in the wake of the airplane but is energized in a predetermined pattern to retain its path of movement for a prolonged period prior to its uncontrolled spray. In this manner the spray is withheld from total dispersement until it is closer to the surface being treated and thereby applied to a relatively restricted area.

More specifically, the device herein proposed includes a multiplicity of nozzles located at selected spaced intervals along each airplane wing and associated vortex generating structures. The several vortices are directed aft of the wings and serve to receive the dispersant leaving the respective nozzles and entrain them in discrete patterns for a distance determined by and built into the design of the vortex creating structure. Such entrainment permits control of the dispersant in its movement from the nozzles to the applied surface area.

Additionally, the ejection of the dispersant in vortices as herein contemplated gives the dispersant a circular or spiralling motion which permits it to reach the undersurfaces of foliage. In both blight and insect control such an application of the chemical is very important.

With the above and other objects in view as will become apparent this invention consists of the construction, combination and arrangements of parts, all as hereinafter more clearly described, claimed and illustrated in the accompanying drawings, wherein:

FIG. 1 is a perspective view taken from one side of and slightly above a conventional airplane which has been modified to incorporate an aerial dispersal system or apparatus designed and constructed in accordance with the teachings of the present invention to show primarily the general arrangement thereof, only one wing and the associated portion of the fuselage of the airplane being shown and a portion of the wing and fuselage being broken away to reveal underlying mechanisms; and FIG. 2 is a perspective view of a fragment of one of the wings of the airplane illustrated in FIG. 1 showing one of the several nozzles and its location on the wing relative to the associated vortex generating structure.

Referring more particularly to the drawings 10 designates a portion of a fuselage of a typical airplane having a fixed wing 11 extending from each side thereof. At and along the aft end of each wing 11 is a segmented trailing edge, the individual segments 12, 12' and 12" of which are each pivotally connected or hinged along a line 13 adjacent the shroud line 14. The outermost segment 12 on each wing 11 constitutes an aileron which is actuated by the pilot or operator through conventional control linkage 15 to and from the undeflected position shown in FIG. 1 to cause the usual flight maneuvers of the airplane.

The remaining, alternate segments 12' and 12" of each wing 11 are connected to actuating linkage operable by the pilot from the cockpit or cabin of the airplane. More particularly, every other segment 12' of each wing 11 is pivotally connected through a horn 16, a rod 17 and lever 18 to a torque tube 19. Each torque tube 19 in turn is connected at its remote end to a lever 20 connected through a power actuator 21 to a pilot's control lever or stick 22.

The alternate segments 12" of each wing 11 are similarly connected to a pilots' control lever or stick 22' through equivalent elements, viz., a horn 23, rod 24, lever 25, torque tube 26, lever 27 and actuator 28. Thus, the alternate segments 12' and 12" of each wing 11 are designed and contructed to be actuated in the same direction by simultaneous movement of the sticks 22 and 22' in the same direction whereby to constitute flaps as conventionally employed to effect lift/drag of the airplane for take-off and landing. At the same time these segments 12' and 12" are designed and constructed to be actuated in different directions by movement of the sticks 22 and 22' in opposite directions during the aerial dispersal operation to be described.

On the upper surface of each wing 11 at each function of the alternate segments 12' and 12" is provided a nozzle 29 enclosed within a fairing 30 and directed aftwardly. The size and shape of each nozzle 29 is determined by the particular dispersant to be employed. Preferably each of these nozzles 29 are located about one diameter above the adjacent wing surface and about one diameter forward of the shroud line 14 of the wing 11.

At its other end each nozzle 29 passes into the interior of the associated wing 11 where it connects to a duct 32 which is common to all the nozzles 29 of that wing 11. At its other end each duct 32 connects in any conventional manner first to an intermediate pressure source or pump 33 and then to a tank 34 of selected chemical or dispersant. If desired the tank 34 may be common to the ducts 32 of both wings 11. In any event an on/off switch 35 operated by conventional linkage connecting it to a remote control 36 is operatively connected to each pump 34 to ensure the flow of dispersant from each tank 33 to the several nozzles 30 when desired.

When the spraying operation is to commence the pilot of the airplane actuates his control levers 22 and 22' so as to move the several segments 12' and 12" in opposite directions creating, in effect, a sawtooth trailing edge of the wings 11. The resulting disruption of the air flow over each wing's surface creates a vortex at each junction of the segments 12' and 12" which sheds in the wake of the associated wing 11. The aileron 12 may be separately actuated to dispose it in the direction opposite to the adjacent segment 12'.

Upon actuation of the pumps 33 through actuation of the control 36 and operation of the switch 35 the dispersant within the tank or tanks 34 is delivered through each duct 32 and ejected from the several nozzles 29. As the dispersant is thus released it is picked up by and entrained in the adjacent vortex which thereafter controls its direction of movement in a circular or spiral motion.

While the invention has been hereinabove illustrated and described in what is believed to be its best and most practical form under present day conditions, it is recognized that under other conditions this form would be modified. No attempt has been made to specifically incorporate any of such other forms in this disclosure in the interest of clarity of the total inventive concept. The claims are relied upon to cover these other forms generally.

What is claimed is:

1. An aerial dispersal system for the distribution of chemicals from an aircraft having a pair of fixed wings comprising:
    a segmented trailing edge on at least one of said wings, the individual segments of which are hinged at and along a common line;
    a nozzle mounted on and carried by said at least one wing at each of the adjacent edges of said segments, each said nozzle being located forward of said common hinge line and facing in an aft direction;
    a source of dispersant;
    ducting between said dispersant source and each said nozzle;
    a control connected in said ducting and operable in the alternate to permit and to prevent the flow of dispersant from said source to each said nozzle; and
    an actuator connected to each said segment and operable to move each alternate segment in opposite directions to generate turbulence in the air flow passing said at least one wing during flight of the aircraft at each junction of said segments which turbulence sheds in the wake of said aircraft whereby dispersant when ejected by each said nozzle is entrained by the turbulence created by the associated segments.

2. The system of claim 1 wherein each said nozzle is located on the upper surface of the associated wing with its outlet approximately one nozzle diameter above the wing and approximately one nozzle diameter ahead of the leading edge of the associated segment.

3. The system of claim 2 including a fairing over and around each said nozzle.

4. The system of claim 1 including linkage connected to the outermost segment of said at least one wing and operable for the deflection thereof and a control lever connected to each of the alternate remaining segments of said at least one wing and operable for the deflection thereof in unison.

5. The system of claim 4 including a second control lever connected to each of the remaining segments of said at least one wing and operable for the deflection thereof in unison.

* * * * *